US006847354B2

(12) United States Patent
Vranish

(10) Patent No.: US 6,847,354 B2
(45) Date of Patent: Jan. 25, 2005

(54) THREE DIMENSIONAL INTERACTIVE DISPLAY

(75) Inventor: John M. Vranish, Crofton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 308 days.

(21) Appl. No.: 09/804,645

(22) Filed: Mar. 13, 2001

(65) Prior Publication Data

US 2002/0000977 A1 Jan. 3, 2002

Related U.S. Application Data

(60) Provisional application No. 60/191,472, filed on Mar. 23, 2000.

(51) Int. Cl.[7] .................................................. G09G 5/00
(52) U.S. Cl. ....................................... 345/173; 345/174
(58) Field of Search ................................. 345/173, 600, 345/174, 902, 132, 901, 475, 699, 698, 501; 178/18.01–18.07; 318/358.1; 340/870.37; 330/69; 324/664, 688, 662; 356/73; 280/731, 735

(56) References Cited

U.S. PATENT DOCUMENTS

| | | | | |
|---|---|---|---|---|
| 5,140,670 A | * | 8/1992 | Chua et al. .................... 706/29 |
| 5,166,679 A | * | 11/1992 | Vranish et al. ......... 340/870.37 |
| 5,251,322 A | * | 10/1993 | Doyle et al. ................. 345/501 |
| 5,373,245 A | * | 12/1994 | Vranish ....................... 324/662 |
| 5,515,001 A | * | 5/1996 | Vranish ......................... 330/69 |
| 5,539,292 A | * | 7/1996 | Vranish .................. 318/568.21 |
| 5,726,581 A | * | 3/1998 | Vranish ........................ 324/688 |
| 6,122,042 A | * | 9/2000 | Wunderman et al. .......... 356/73 |
| 6,135,494 A | * | 10/2000 | Lotito et al. ................. 280/731 |
| 6,422,595 B1 | * | 7/2002 | Breed et al. ................. 280/735 |
| 6,459,424 B1 | * | 10/2002 | Resman ....................... 345/173 |
| 6,489,784 B2 | * | 12/2002 | Adams et al. ............... 324/664 |

FOREIGN PATENT DOCUMENTS

EP  1 164 240 A2 * 12/2001

OTHER PUBLICATIONS

Killmeyer et al. Auto–Collision Warning Device, Fall 1995, Electrical and computer engineering WVU.*

* cited by examiner

Primary Examiner—Vijay Shankar
Assistant Examiner—Prabodh M. Dharia
(74) Attorney, Agent, or Firm—Keith L. Dixon

(57) ABSTRACT

A three-dimensional (3-D) interactive display and method of forming the same, includes a transparent capaciflector (TC) camera formed on a transparent shield layer on the screen surface. A first dielectric layer is formed on the shield layer. A first wire layer is formed on the first dielectric layer. A second dielectric layer is formed on the first wire layer. A second wire layer is formed on the second dielectric layer. Wires on the first wire layer and second wire layer are grouped into groups of parallel wires with a turnaround at one end of each group and a sensor pad at the opposite end. An operational amplifier is connected to each of the sensor pads and the shield pad biases the pads and receives a signal from connected sensor pads in response to intrusion of a probe. The signal is proportional to probe location with respect to the monitor screen.

33 Claims, 12 Drawing Sheets

THREE DIMENSIONAL INTERACTIVE DISPLAY

CROSS REFERENCES TO RELATED APPLICATIONS

This application claims the benefit of priority under 35 U.S.C. § 119(e) to U.S. Provisional application Ser. No. 60/191,472 filed Mar. 23, 2000.

ORIGIN OF INVENTION

The inventor of the invention described herein is an employee of the United States Government. Therefore, the invention may be manufactured and used by or for the Government for governmental purposes without the payment of any royalties thereon or therefor.

BACKGROUND OF THE INVENTION

1. Technical Field of the Invention

This invention generally relates to data input devices and more particularly to an apparatus, for a manual input device manually providing three dimensional input to a computer.

2. Description of Related Art

U.S. Pat. No. 5,373,245 ('245) entitled "Capaciflector Camera" to John M. Vranish, which is incorporated herein by reference, teaches a capacitive type proximity sensor having an improved range and sensitivity between the sensor surface and an intruding object in the vicinity of that surface. The capaciflector camera described therein includes sensors and a shield that are strips of conductive material with an insulator coating. These strips of conductor material are such that the capaciflector camera can measure a field induced at a range of approximately 33 feet. The sensors may be arranged in a basket weave arrangement and are each connected to an operational amplifier and resistor for sensing signal. The capaciflector camera is used, primarily, for robotics in berthing and docking during robotic construction assembly and maintenance, especially in outer space and also for imaging and navigation for planetary rover robots.

U.S. Pat. No. 5,515,001 entitled "Current-Measuring Operational Amplifier Circuits" to John M. Vranish, incorporated herein by reference, teaches an operational amplifier (op amp) connected in series with a load and a current measuring impedance that may be used in with the Vranish capaciflector camera.

U.S. Pat. No. 5,726,581 entitled "Three-D Capaciflector" to John M. Vranish incorporated herein by reference, teaches a capacitive type proximity sensor with improved range and sensitivity. The 3-D capaciflector senses the relationship between a surface of an arbitrary shape and an intruding object in the vicinity of the surface. The 3-D capaciflector camera is a non-planar capaciflector camera, provided in an example as a tubular shaped capaciflector camera.

The above described capaciflector camera is positioned to three-dimensionally locate objects with respect to other objects, in particular in an open space for robotic arm moving to position a workpiece with respect to a second workpiece to which the first workpiece is to be attached. In particular, the capaciflector camera sensors were described as being placed on or near mounting pins, latches and holes, thereby providing information at or near points of contact between the particular work pieces being mated to achieve improved precision and simplify such work. Thus, the capaciflector camera positioned on the workpiece aides in navigating and docking of the second workpiece with the first by maintaining the 2 or 3-D positional relationship of the second workpiece with the first workpiece upon which the capaciflector camera is mounted. Sensor signals from the op amps are digitized and passed to a computer which calculates the relative positions of the two objects, (workpieces). Thus, the capaciflector camera provides a powerful computer input device for manufacturing, assembly and robotics.

Well-known manual input devices for computers include keyboards, a mouse, a track ball, touch pads, joysticks and among others. Voice entry is also becoming increasing in importance. However, all of these manual input devices are relatively disconnected from the response to the input that is being displayed by the computer. Digital signatures for example, are input, typically, with a stylus on some type of a touch pad and, the result is displayed on a display screen. The touch pad may be several feet from the display screen. Thus, it often may not be immediately apparent whether the computer response to the manual input accurately reflects or inaccurately reflects the intended input.

Thus there is a need for improved manual input/digital response (display) correlation paralleling hand to eye coordination for computer systems.

SUMMARY OF THE INVENTION

It is a purpose of the present invention is to improve manual input to displayed response coordination.

The present invention is a three-dimensional (3-D) interactive display system, display and method of forming thereof. A transparent capaciflector (TC) camera is formed on a transparent shield layer on the screen surface. A first dielectric layer is formed on the shield layer. A first wire layer is formed on the first dielectric layer, wires on the first wire layer run in a first direction. A second dielectric layer is formed on the first wire layer. A second wire layer is formed on the second dielectric layer, wires on said second wire layer are orthogonal to wires on the first wire layer. The TC camera is protected by a surface dielectric layer. Wires on the first wire layer and second wire layer are grouped into groups of parallel wires with a turnaround at one end of each said group and a sensor pad at the opposite end. Each group of parallel wires includes five silver wires spaced a half a centimeter apart. The transparent shield layer is a 25 µm thick layer of conductive glass with a shield pad at one side. Vias, filled with silver epoxy, provide contact to each of the sensor or shield pads. An operational amplifier connected to each of the sensor pads and the shield pad biases the pads and receives a signal from connected sensor pads in response to intrusion of a probe. The signal is proportional to probe positional location with respect to the monitor screen. The operational amplifiers are driven from a common oscillator. In alternate embodiments the wire groups may be replaced with rows and/or columns of capaciflective pixels formed from 25 µm thick conductive glass plates, each row/column of pixels being connected together by a single wire to a sensor pad.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Furthermore, all the mathematic expressions are used as a short hand to express the inventive ideas clearly and are not limitative of the claimed invention.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
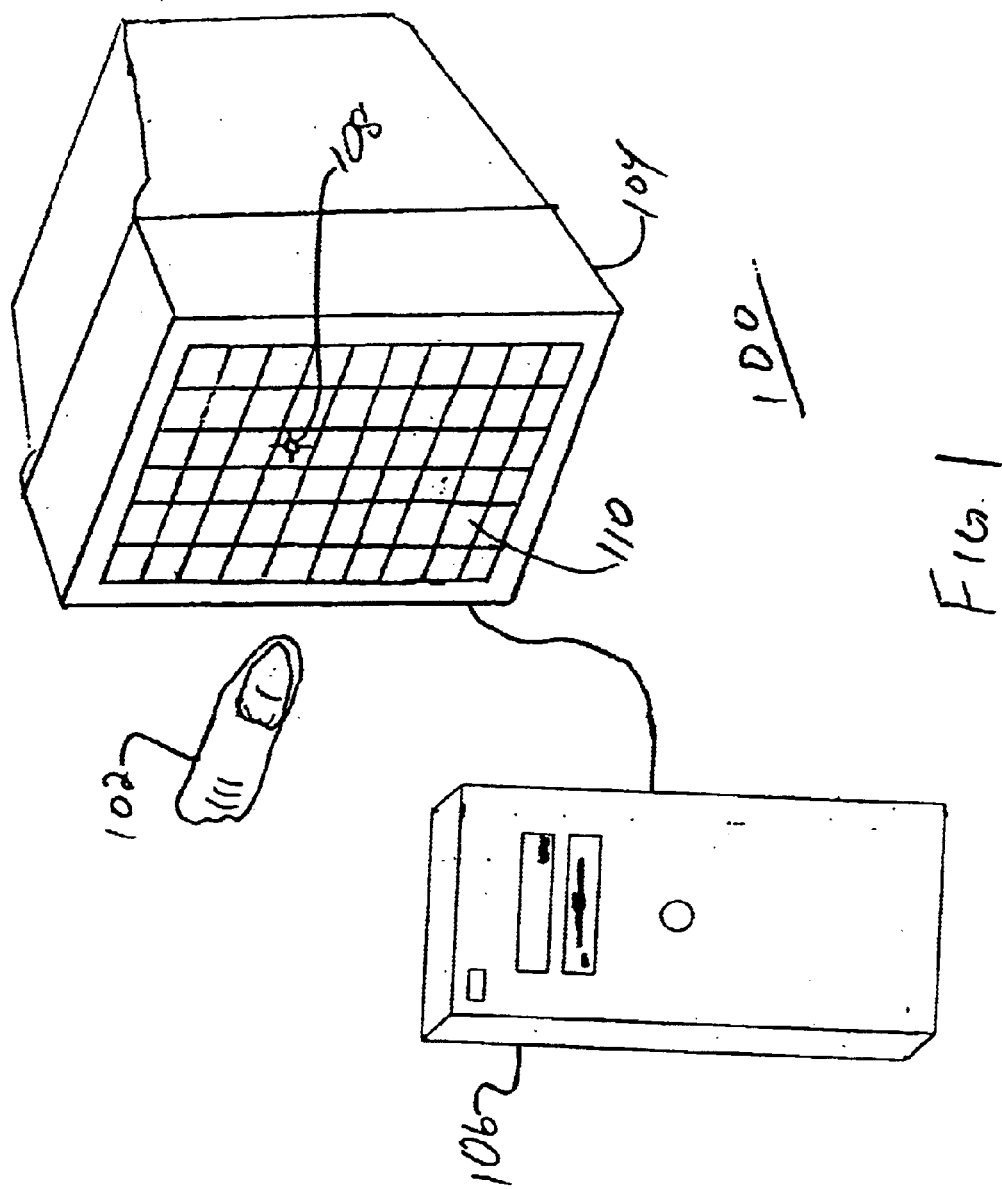
FIG. 1 shows a (3-D) Interactive Display System according to the present invention.

Turning now to the drawings and more particularly, FIG. 1 shows a three dimensional (3-D) Interactive Display System 100 according to the present invention. An operator probe 102 is shown directed at a 3D interactive display 104. The probe 102 may be a stylus, a finger, a point on a hand or any other appropriate object. The type and shape of the probe 102 may be selected as appropriate for the particular application being executed and displayed and for the desired computer response.

The display 104 of the present invention includes a transparent capacitor (TC) camera 110 (represented as a grid) covering the face of a computer monitor. In addition to the display 104, the computer monitor includes interface circuits (not shown) connecting both the TC Camera 110 and the monitor to a computer 106. Accordingly, a computer-driven signal processor (not shown) is included to interpret signals from the TC camera 110 and provide interpreted signal results to the computer 106 which, in turn, interprets how the monitor image should reflect the proper response (represented by cross-hair 108) to the most current information from the TC camera 110. The computer 106 is programmed to generate monitor images and behavior rules of engagement for received TC camera 110 image data. An operator observes display responses to previous actions, i.e., to probe 102 movements reflected on the display 104. As referred to herein, pixel refers to an intersection of a row and a column, whether inhabited by orthogonal rows and columns of wires or by transparent conductive glass plates as described for alternate embodiments hereinbelow.

Figure 2:
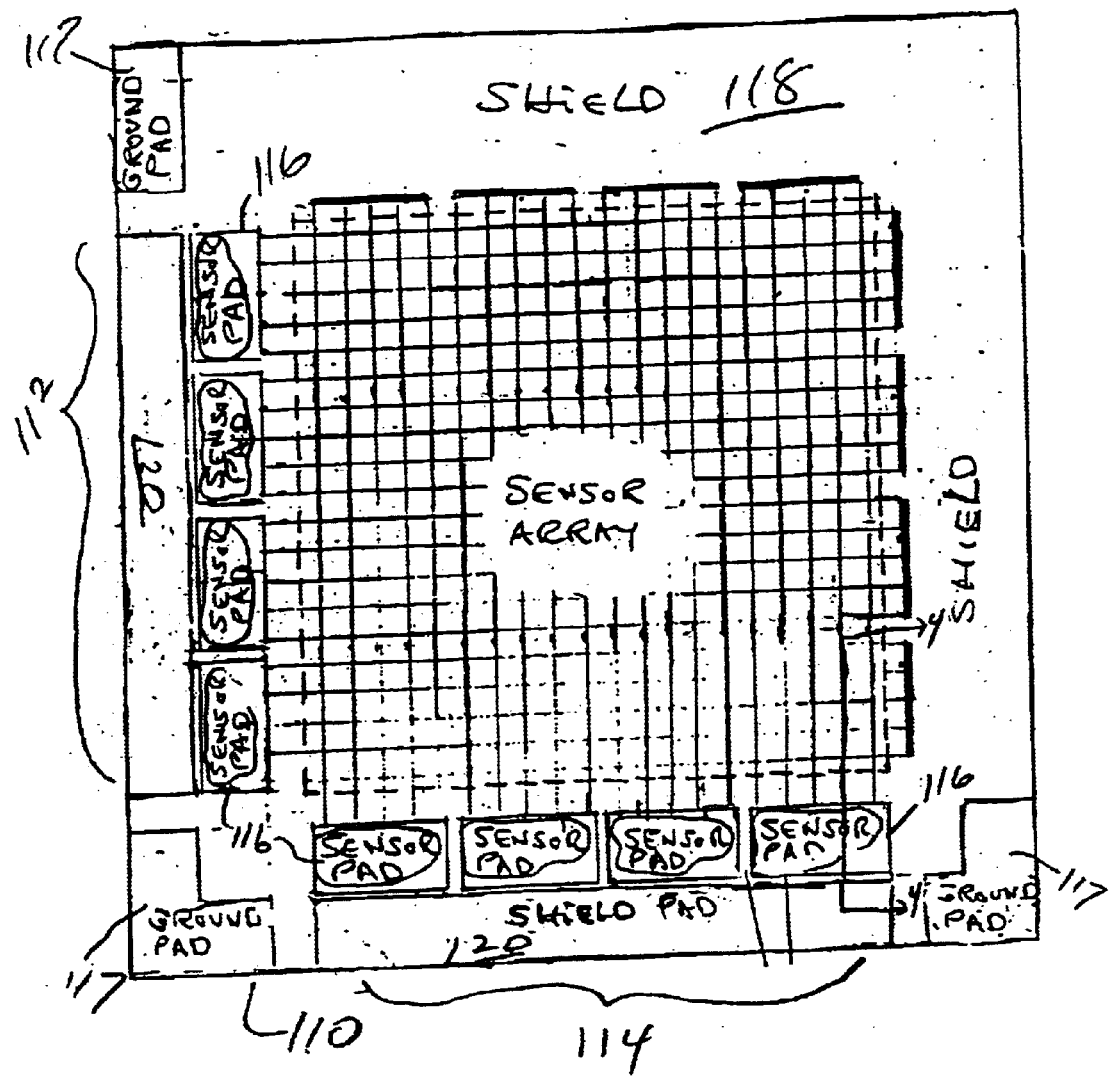
FIG. 2 shows a top assembly view of the preferred embodiment TC camera and display.

FIG. 2 shows a top assembly view of the preferred embodiment TC camera 110 and display 104. The sensor array 110 is disposed in the center and covers the entire viewing screen surface of the computer display 104. An X-grid 112 and a Y-grid 114 are each disposed orthogonally on the display surface, i.e., X-grid 112 over Y-grid 114 or vice versa. Sensor pads 116 are located on at least two sides of the sensor array, passing signals from the X-grid 112 and Y-grid 114 to connected signal amplifiers (not shown) such as described, for example, in U.S. Pat. No. 5,515,001 entitled "Current-Measuring Operational Amplifier Circuits" to J. M. Vranish, incorporated herein by reference. Ground pad connections 117 are located on corners of the assembly. A shield layer 118 is disposed on the display surface beneath the X-grid 112 and Y-grid 114 and extends around the perimeter of the sensor array and attached sensor pads 116. A shield pad 120 is provided on at least one side of the shield 118. The shield 118 is activated with an identical potential (frequency, phase and magnitude) thereby projecting electric fields generated by the grids 112, 114 away from the display surface.

Figure 3:
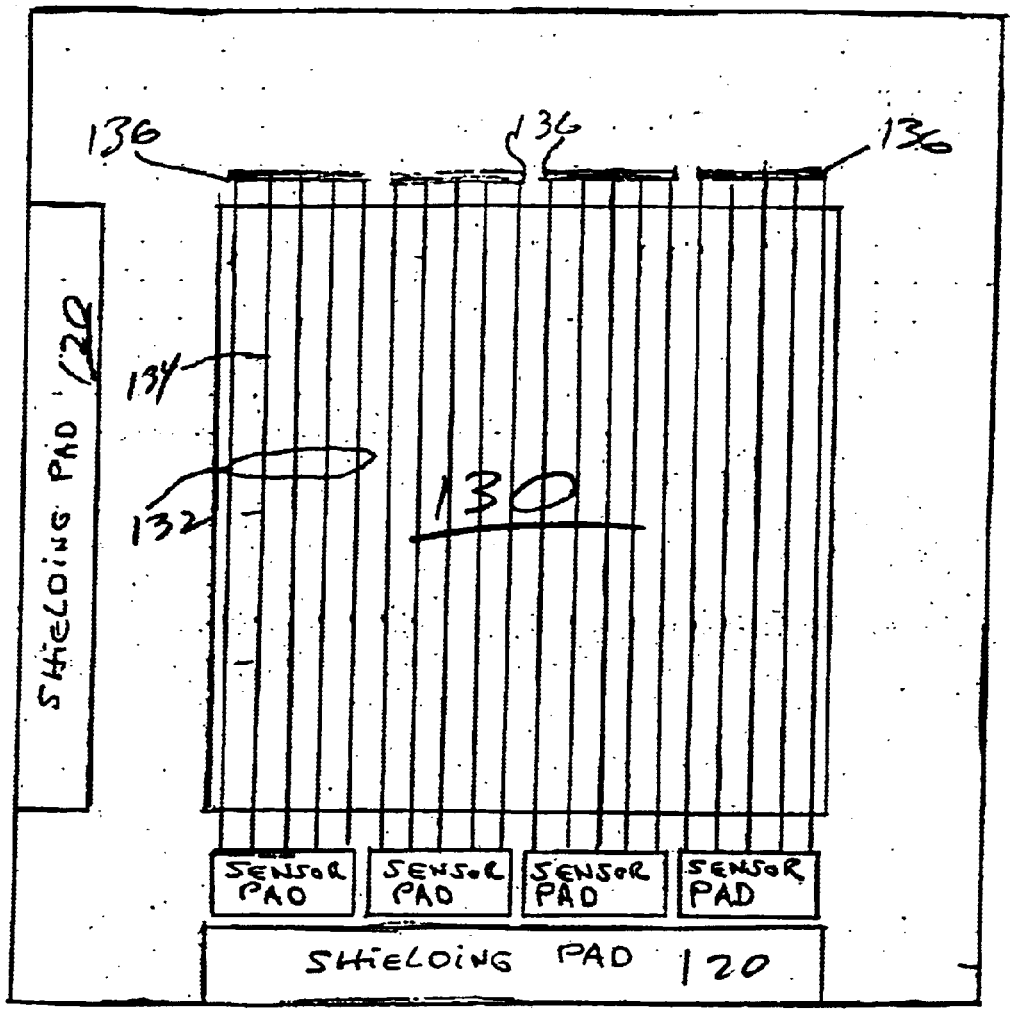
FIG. 3 shows an example of the preferred embodiment X grid and Y grid row/column sensor arrangement.

FIG. 3 shows an expanded example of the preferred embodiment X-grid 112 and Y-grid 114 row/column sensors 130. The sensor grids 130 each include groups 132 of parallel wires 134. Each group 132 is connected to a sensor pad 102 in a corresponding row or column. An operational amplifier (not shown) is connected to each sensor pad 102. A turnaround 136 is disposed at the end opposite the sensor pad 102 of each wire group 132. The turnarounds 136 provide redundancy, for example, compensating for broken or open lines 134. Each group 132 of wires 134 includes multiple (>2) very fine wires, 5 in this example. The wires are thin enough that the grids are essentially invisible or, at the very least, they are not noticeably apparent. Preferably, the wires are 0.001" (25 μm) thick by 0.002" (50 μm) wide, silver wires and spaced 0.2 inches (0.5 cm) apart, extending the entire length/width of the display screen.

Figure 4:
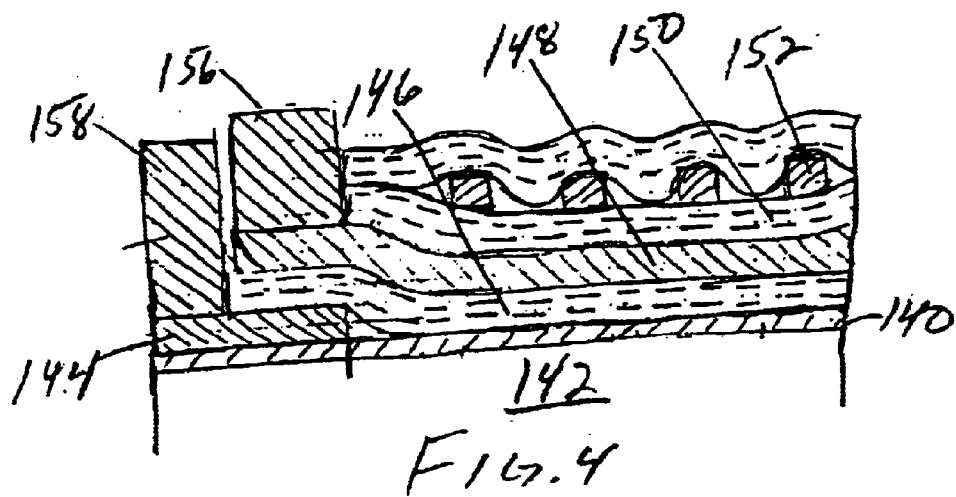
FIG. 4 shows a cross section of the preferred embodiment TC camera of the present invention.

FIG. 4 shows a cross section of the preferred embodiment transparent capaciflective camera of the present invention of FIGS. 2 through 4-4. First, a 96% transparent shield film of Indium Tin Oxide, Tin Oxide or another suitable material, 1,000 ohms per square (Ω/SQ), is formed on the base surface 142. Preferably, the shield film is a 0.001 inch (25 μm) thick layer of conductive glass 140 which is transparent at this thickness, and is formed, for example, on the glass face of a cathode ray tube (CRT) or computer monitor screen. Next, a shielding pad layer 144 is deposited and patterned on the transparent layer 140. The shielding pad layer 144 is, preferably a 0.010 inch (250 μm) thick copper layer and may be deposited using any well known photo lithographic process, such as a liftoff type metalization process. Next a first transparent insulator layer 146 is deposited on the entire surface of the shield. Preferably the first transparent insulator layer 146 is 0.001 inches (25 μm) thick. Next, the first grid wire layer 148 is formed. The first grid wire layer 148 is formed, preferably, using a silver paste material to form wiring patterns on the surface of the first transparent insulator layer 146 and, then, firing the surface at a suitable temperature to form the wires from the paste patterns. Such methods are well known in the art. Next, a second transparent insulating layer 150, identical to the first 146, is formed on the first grid layer 148. A second grid layer 152 is formed on the surface of the second transparent layer 150 identically and orthogonally to the first grid layer 148.

Sensor pads 116 and sensor turnaround patterns 136 included in each layer 148, 152 during formation of both. A final transparent surface passivation layer 154 is formed on the second grid layer 152. The surface passivation 152 is formed of material identical to that used for the first and second transparent insulating layers 146, 150. Then, vias 156, 158 are opened down from the surface passivation layer to each of the sensor pads and to the shield pad. The open vias 156, 158 are filled with silver epoxy which provides a conductive contact to pads in each of the respective layers.

Thus, the present invention is a TC camera 110 that is a hands-free non-contact, 3D manual input device, 3D interactive system including the TC camera 110 and a method of forming the input device and system. According to the preferred embodiment of the present invention, a TC camera 110 is disposed on the face of a computer display 104. The TC camera 110 senses position, movement and direction of movement of a probe 102 disposed in front of the screen. Sensed probe signal information is passed to a connected computer 106 which, in turn, interprets the sensed information, formulates a response and reacts (displays the programmed response) to the probe 102 accordingly.

Driver circuits for capaciflector cameras are well known in the art and may be easily adapted for use with the preferred embodiment. Each voltage-follower includes a resistor in its feedback loop configuring it as a Current-Measuring Voltage Follower as described in U.S. Pat. No. 5,515,001 entitled "Current-Measuring Operational Amplifier Circuits" to John M. Vranish, incorporated herein by reference. Typically one such Current Measuring Voltage Follower is connected to a sensor pad 158 or the shield pad 156 and driver by a common oscillator frequency. Thus, the system performs as a multi-pixel sensor array in which all pixels and the driven shield are at the same voltage and at all times in phase.

By maintaining all pixels (grids 112, 114) and the driven shield 118 at the same voltage and in phase, cross-talk between the pixels is eliminated with the driven shield 118 reflecting electric energy fields away from electrical ground and towards any approaching probe 102. Thus range, resolution and signal-to-noise ratio are all at peak performance levels. However, as a conductive/dielectric probe 102 approaches the TC camera 110, the impedance changes at individual pixels. A response is felt in a connected Current-Measuring Voltage Follower which both supplies any needed additional current and measures any phase shift and the amount of current supplied. These current changes varying for each pixel depending upon that particular pixel's physical relationship to the probe 102 and so, considering all pixels together, a capacitive (3-D) image of the probe may be derived.

At any distance above the preferred TC camera 110 greater than the spacing of the grid wires 134, especially since the probe is the centroid of an object instead of a point, each grid row/column 132 may be treated, effectively, as a solid metal strip rather than individual lines. Further, using software to interpolate, the combined lines of each grid/column may be treated as a solid strip at even closer ranges. Thus, probe 102 distance and location determination may be treated essentially, identically for all embodiments (including the below described alternate embodiments) with potentially only minor adjustments being necessary, but with accurate results, at least to the first order. Thus, the below description of locating objects within the TC camera 110 viewing field is provided without reference to any particular embodiment and is intended to be applicable equally to all embodiments, any special requirements for a particular embodiment being noted specifically.

Accordingly, the probe's X-Y position and correspondingly movement, may be derived from parameter changes in response to probe placement. It is well known that:

$$C = \frac{\varepsilon A}{d},$$

where:
A=Pixel Area
d=Range (separation between the probe and TC camera face)
$\varepsilon$=Dielectric Constant of air Table 1 shows the affect of probe distance on various parameters for probe distances below 6" with each row/column in series combination with 450Ω, at a 100 MHz oscillator and voltage of 12V and 1.2V across the series combination with the oscillator voltage reduced to 1.2 volts at close range, e.g., 0.010468 in. (26 μm), the signal is 1.126V.

Thus, probe distance can be ascertained using the relationship $$V_{OSC} = V(S) = \frac{I(S)}{G}R + \frac{I(S)}{SC}$$

$$\text{So, } C = \frac{I(S)}{S(V(S) - I(S)R)}$$

Since C is related to probe distance (d) from the capaciflector screen, $$d = \frac{\varepsilon A}{C}.$$

TABLE I

| Range (in.) | C (pF) | $X_{c\,max}$ (kΩ) | I (μA) | Signal (mV) | Vosc V |
|---|---|---|---|---|---|
| 6 | 12 | 132.6 | 90.2 | 60 | 12 |
| 3 | 24 | 66.3 | 179.7 | 119.5 | 12 |
| 1.5 | 48 | 33.2 | 357.1 | 237.4 | 12 |
| 0.75 | 96 | 16.6 | 704.7 | 468.6 | 12 |
| 0.375 | 192 | 8.29 | 1,373 | 913.1 | 12 |
| 0.1875 | 384 | 4.14 | 2,612 | 1,737 | 12 |
| 0.09375 | 768 | 2.07 | 475.7 | 316.4 | 1.2 |
| 0.041875 | 1536 | 1.04 | 807 | 537.0 | 1.2 |
| 0.0209375 | 3072 | 0.518 | 1,240 | 824.4 | 1.2 |
| 0.01046875 | 6144 | 0.259 | 1,693 | 1,126 | 1.2 |
| 0.00523438 | 12,288 | 0.1295 | 2,071 | 1,377 | 1.2 |

Lateral probe movements may be determined by considering that reducing range and deriving current from the same pixel area (i.e., holding pixel area constant) provides the same response as holding the probe range constant and increasing the pixel area by the same factor. So, an increase in signal from an object at close range, for example at 0.010 in. (25 mm) above ½ pixel and moving in the X-Y plane to cover the entire pixel, provides the same response pixel as holding the probe, directly above the pixel at 0.020 in. (50 mm) and moving it closer in the Z direction to 0.010 in. (25 mm). From Table 1, above, it can be seen that at 0.0101" the signal is 1.126V and 0.8244V at 0.020" for a signal difference of 0.3016V. Approximately the same signal change results from moving laterally in the X-Y plane at a probe height of 0.010" e.g., from covering half of a pixel to covering the entire pixel. So, for accurate positional location, preferably, sense circuits are sensitive enough to discriminate a 60 mV signal difference. Further, typically, multiple pixels are affected by probe location and so statistical techniques may be employed to improve probe resolution. Such signal discrimination circuits and techniques are well known in the art.

Figure 5:
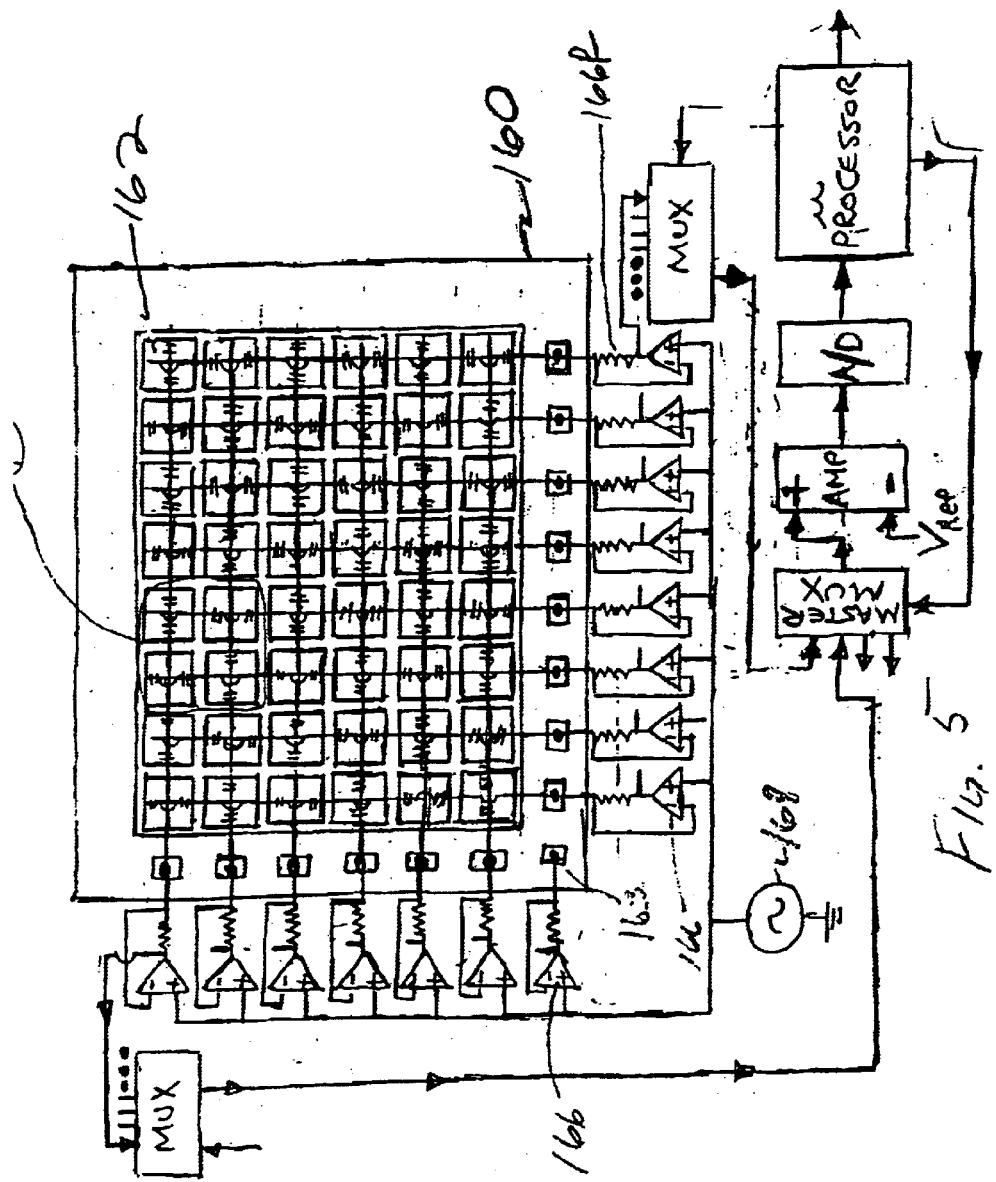
FIG. 5 shows a plan view of an alternate embodiment 3-D interactive TC camera.

FIG. 5 shows a plan view of an alternate embodiment 3-D interactive transparent capaciflector camera 160. In this TC camera embodiment, instead of finely spaced grids of thin silver wires, each of the two orthogonally placed layers includes row/columns of conductive glass plates 162 arranged over the screen. As in the above embodiment, there are two orthogonal layers of these plates or pixels, an X layer and a Y layer. The plates 162 (pixels) in each layer are arranged such that when the two layers are overlaid, alternate pixels in each row or in each column belong to alternate ones of the two layers. Each of the plates 162 is, preferably formed from a thin transparent layer of conductive glass, 0.001 inches (25 microns) thick, as described above for the shield layer of the first preferred embodiment. Each plate in this embodiment is ¼" square (0.62 centimeters by 0.62 centimeters). A plate connection row/column wire runs along the direction of the layer, i.e. in the X direction for the X layer and the Y direction for the Y layer, connecting plates for that layer together and to a sensor pad. A single oscillator 168 is shown interfaced with an array of high impedance operational amplifiers (op-amps) 166 each, of which, is configured as a voltage follower current source. The output of each voltage follower is connected to a single element of the sensor array, either a row, a column or the driven shield 163.

Figure 6:
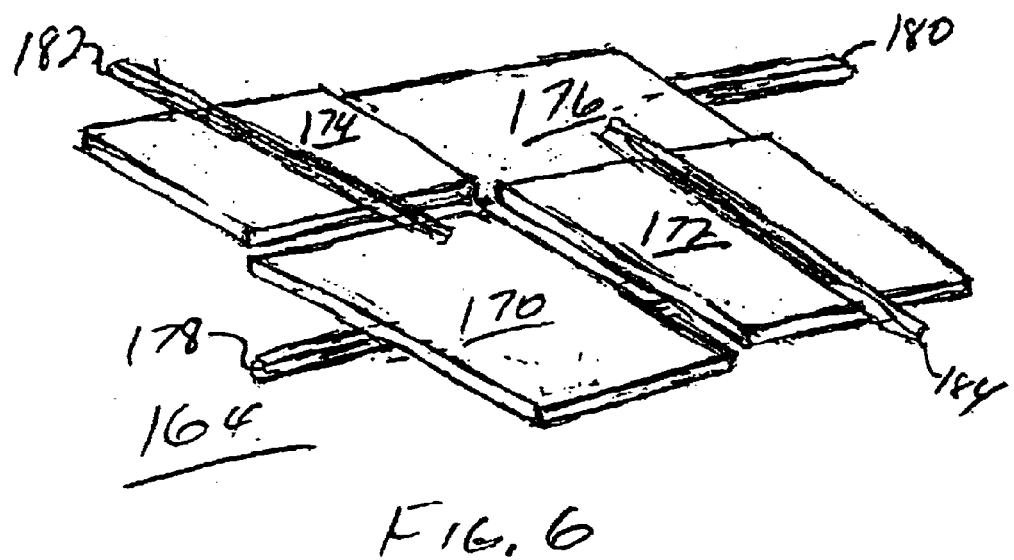
FIG. 6 is blowup of a pixel area in FIG. 5, showing four adjacent pixels.

FIG. 6 is blowup of area 164 in FIG. 5, showing four adjacent pixels 170, 172, 174, 176. As is shown in FIG. 6, horizontally running wires 178, 180 contact row pixels 170, 176 on the first (row) layer of pixels, respectively. Vertically running wires 182, 184 contact column pixels 174, 172 on a second (column) layer, respectively. As in the above preferred embodiment, these two pixel layers are formed above a shield layer (not shown), which is formed on the screen surface of a CRT (not shown).

The TC Camera 160 of this alternate embodiment is formed similarly to the above first embodiment. First, a shield layer is formed on the face of a CRT and a first dielectric layer is formed on the shield layer. Then, a first wire layer is formed, but with a single wire per row/column instead of 5 as in the preferred embodiment. A first pixel layer is formed on the first wire layer. The flat square pixels 162 are formed by depositing a thin conductive glass layer as above and patterning using any well known patterning technique, e.g. a photolithographic pattern and etch. Each of the pixels 162 in this first layer is above and touches only one of the lines and is formed in equally-spaced rows/columns of alternating pixels and spaces, approximately, of equal size. Thus, each square pixel 162 is bonded to one of the equally-spaced, parallel, flat, electrically-conductive row/column wires located directly below it. A second dielectric layer is formed on the first pixel layer. Then, a second pixel layer is formed on the dielectric layer. The second pixel layer is formed identically to the first with pixels 162 being interleaved with the first, i.e., pixels of the second layer placed over spaces of the first and spaces of the second placed over pixels of the first. Next, a second wire layer is formed on the second pixel layer. The second wire grid is formed orthogonally to the first and, preferably, identical with the first, each wire passing over a single column/row, contacting pixels in the second pixel layer over which the wire passes directly. By arrangement of pixels and spaces both within each layer and between the two (2) layers of pixels, TC camera 160 is formed with its face fully covered by pixels 162, pixels 162 being equally and uniformly divided between rows and columns. Finally, the entire TC camera 160 surface is coated with a suitable tough and hard, insulating, fully-transparent coating above the second wire grid, approximately 0.005 in. (125 μm) thick. This surface layer may act as a writing surface for a scribe-probe 102, so it must be a scratch resistant material.

Figure 7:
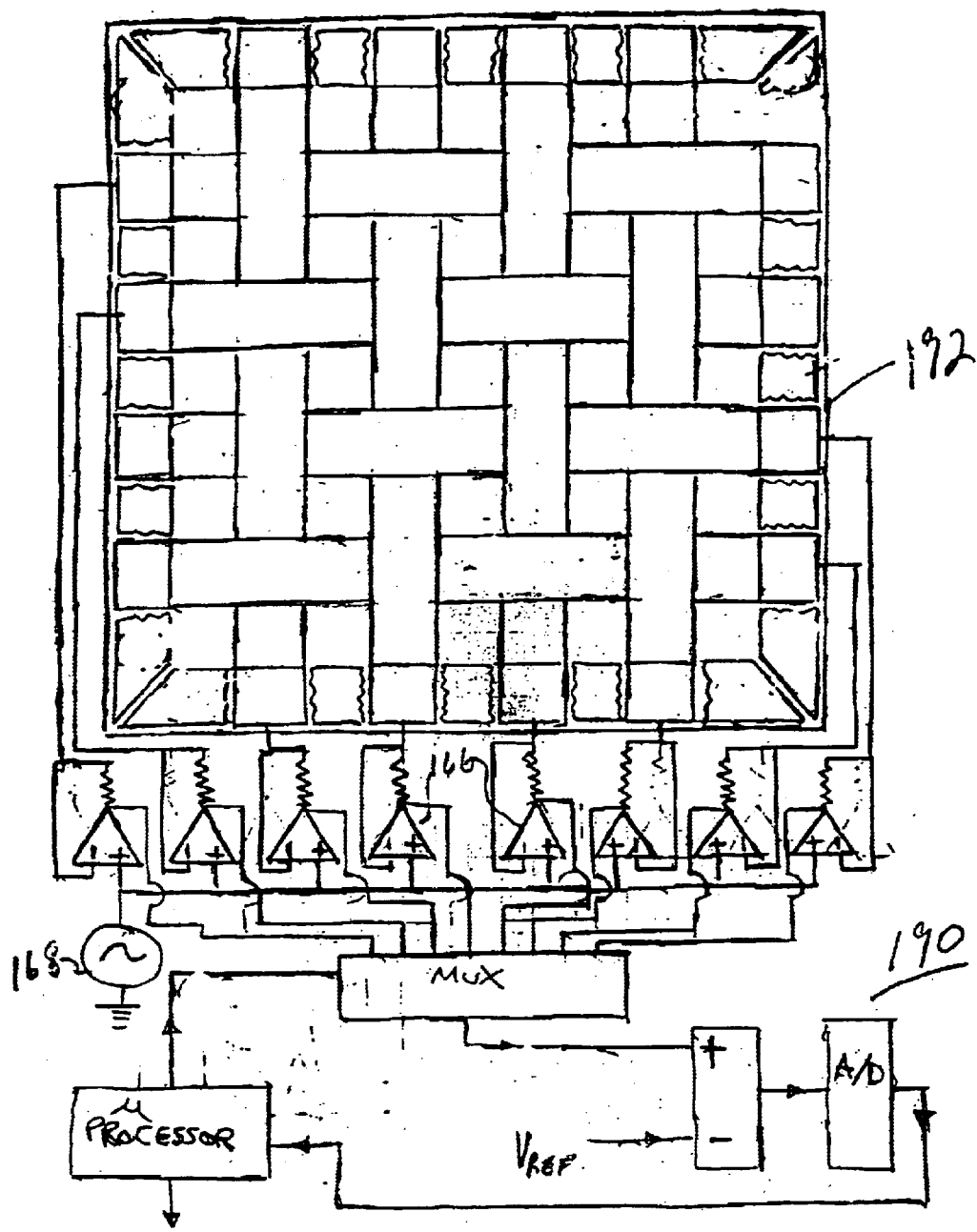
FIG. 7 shows another alternate embodiment TC camera which has a basket weave type receptor field.

FIG. 7 shows another alternate embodiment TC camera 190 which has a basket weave type receptor field 192. In this embodiment a basket weave transparent capaciflector camera is constructed in much the same manner as the above first alternate embodiment and essentially operates in much the same manner.

Figure 8:
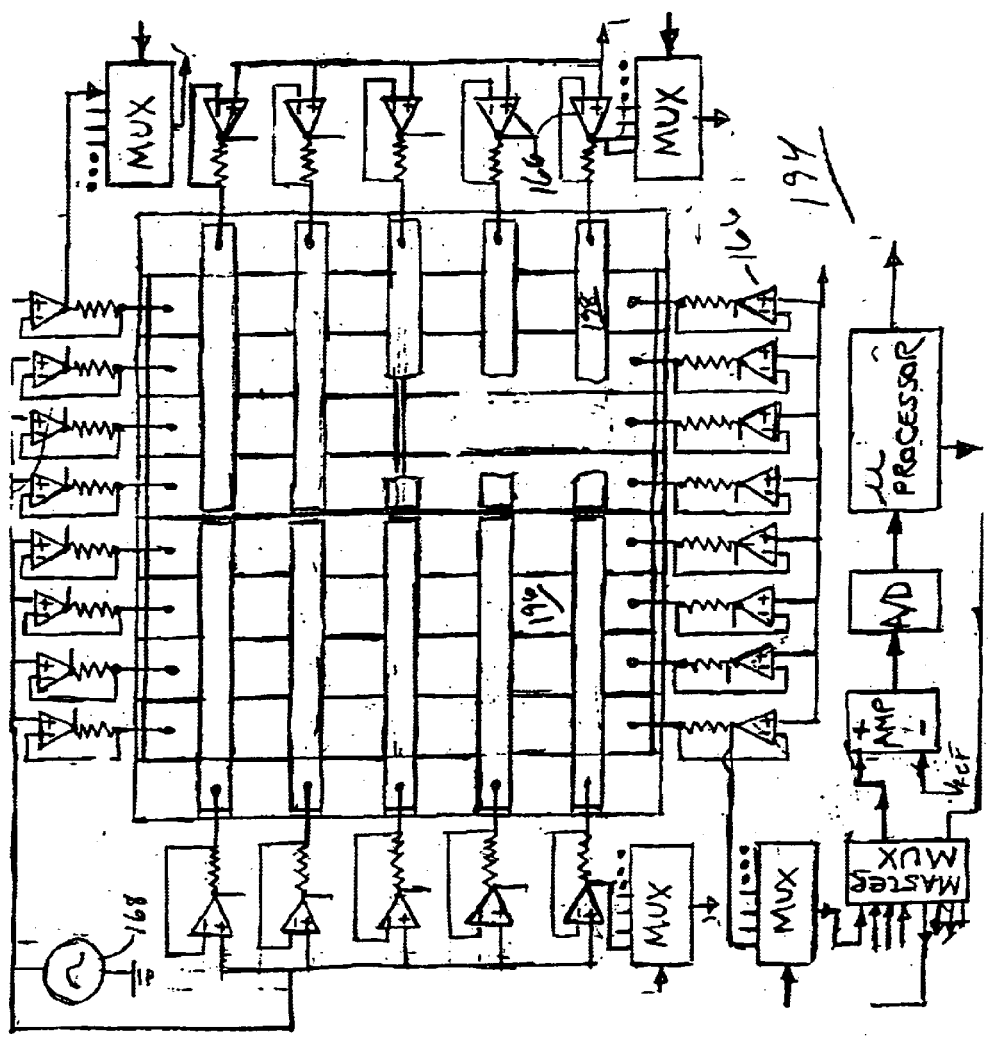
FIG. 8 shows another alternate embodiment TC camera wherein width of column pixels is different than the width of row pixels.

FIG. 8 shows another alternate embodiment TC camera 194 wherein the width of column pixels 196 is different than the width of row pixels 198. This embodiment operates much as the above embodiments except that the disparate sizes and arrangement of column sensors and row sensors must be considered in signal analysis. The larger bottom pixels 196 compensate for blockage by the overlying top pixels 194.

Figure 9:
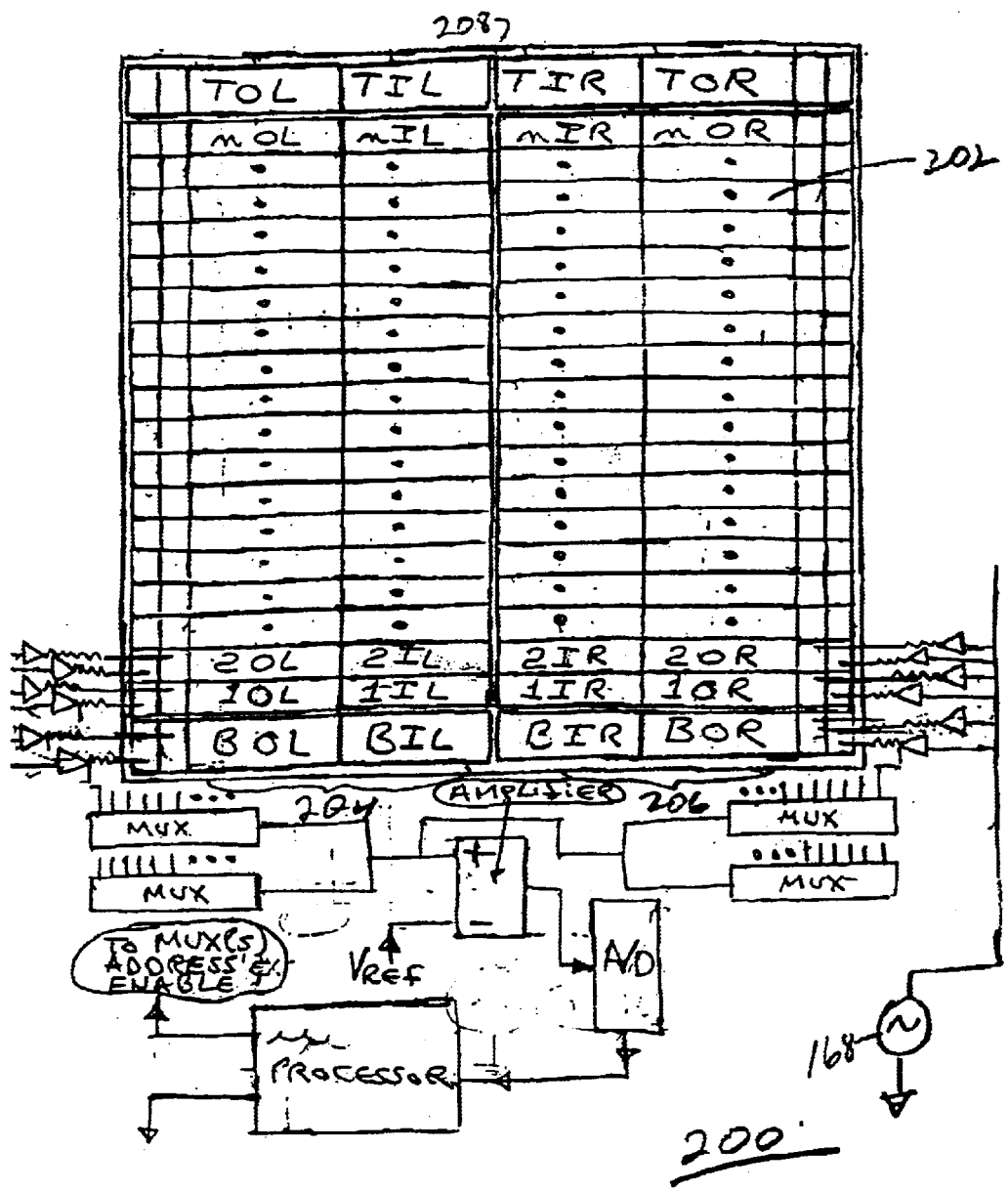
FIG. 9 shows yet another alternate embodiment TC Camera wherein the row pixels overlap each other in 2 layers each.

FIG. 9 shows yet another alternate embodiment TC Camera 200 wherein the row pixels 202 overlap each other in 2 layers each. This embodiment includes 2 layers of plate type row pixels 204 arranged from left to right and 2 layers of row pixels 206 are arranged from right to left, each row meeting in the center, but separated by a small gap 208. It is also apparent that in this embodiment, that the pixels 202 act as driven shields for each other, simultaneously sensing approaching objects. In this way, pixels 202 may be passed beneath each other without causing interference, acting as mutually driven shields with the upper pixel faces acting as a TC camera for an approaching object. With this embodiment, the effect of pixel rows and columns is achieved, even though the device is constructed physically, only, of either rows or columns.

Optionally, where precision is not a primary concern, the first and second wire layers may be omitted for the alternate embodiments of FIGS. 7–9. Table 2 shows the effect of eliminating the wire layers on signal, maintaining the oscillator voltage at 12V throughout. The difference in results between Table 1 and Table 2 can be understood with reference to U.S. Pat. No. 5,166,679 entitled "Driven Shielding Capacitive Proximity Sensor" to Vranish et al., which is incorporated herein by reference.

TABLE II

| Range (in.) | C (pF) | $X_{c\,max}$ (kΩ) | I (μA) | Signal (mV) |
| --- | --- | --- | --- | --- |
| 6 | 12 | 132.6 | 63.4 | 63.4 |
| 3 | 24 | 66.3 | 97.6 | 97.6 |
| 1.5 | 48 | 33.2 | 133.7 | 133.7 |
| 0.75 | 96 | 16.6 | 163.9 | 163.9 |
| 0.375 | 192 | 8.29 | 185 | 185 |
| 0.1875 | 384 | 4.14 | 197 | 197 |
| 0.09375 | 768 | 2.07 | 205 | 205 |
| 0.041875 | 1536 | 1.04 | 208 | 208 |
| 0.0209375 | 3072 | 0.518 | 210 | 210 |

Figure 10:
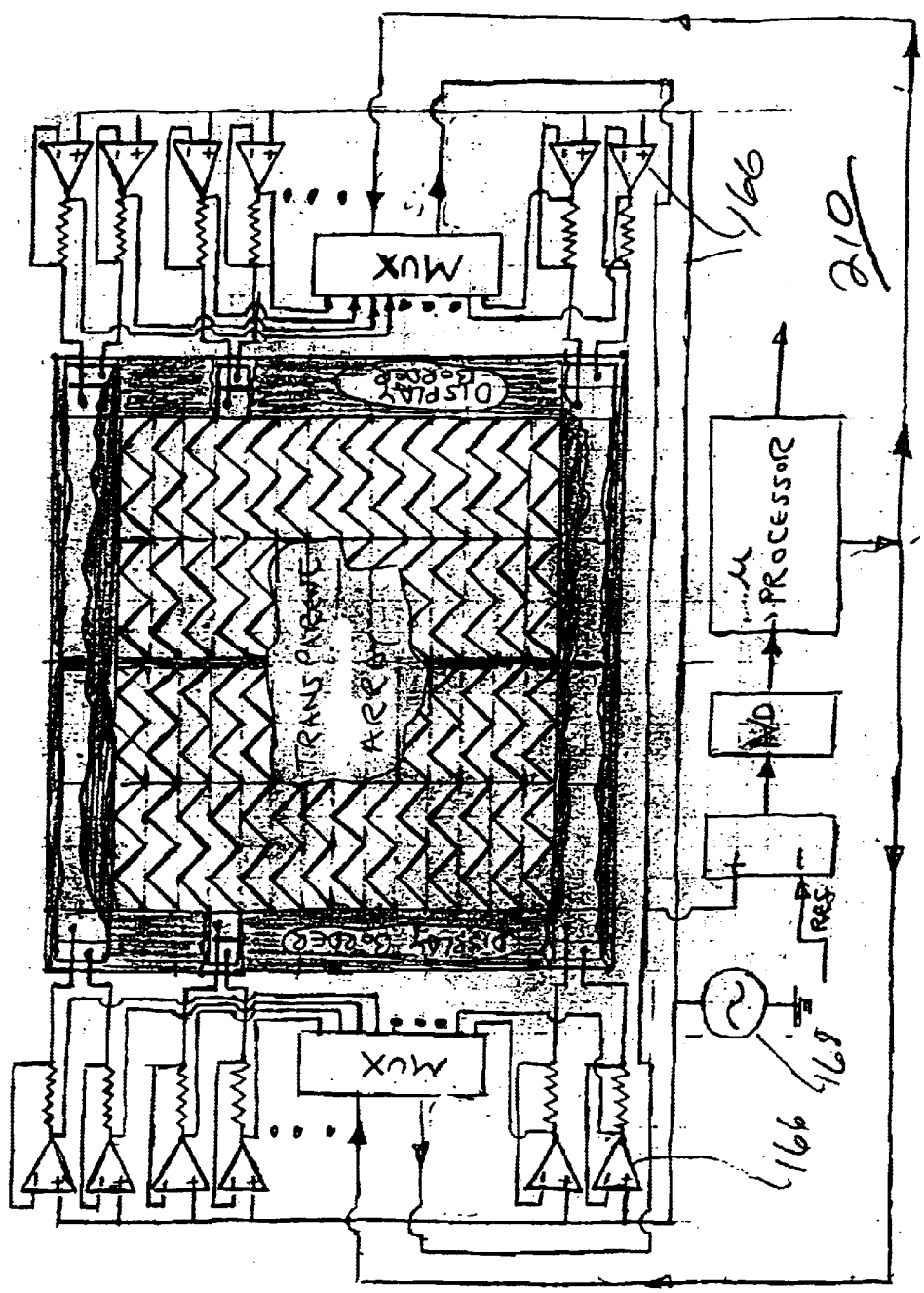
FIG. 10 shows another alternate embodiment TC Camera wherein column or row pixels are triangularly-shaped to alternate herring bone rows and columns.

FIG. 10 shows another alternate embodiment TC Camera 210 wherein column or row pixels are triangularly-shaped to form herring bone rows or columns. In this embodiment similar to overlapping pixel alternate embodiment of FIG. 9, pixels are arranged only in rows (or columns) but are triangularly shaped to yield additional information and resolution about probe location. The triangular pixel pattern facilitates sensing lateral probe movement along one of the rows, the probe being detected by the row above and below the movement. It should also be noted that other periodic-type patterns (e.g., sinusoidal) can be substituted for the depicted herring bone arrangement.

Inclusion of the TC camera on a CRT results in an 3-D interactive display that may be used for a broad range of applications, such as for example, in support of a word processing computer program or a relatively sophisticated 3-D mechanical object design/analysis computer program (such as Pro-E for example). A word processing application example is provided in detail hereinbelow and is illustrative of the simplicity and utility of such a 3-D interactive display for every day tasks. A 3-D mechanical object/analysis application example illustrates the power and capability range of such a 3-D interactive display.

Advantageously, the TC camera of the present invention enables real-time interactive 3D communications between an operator and a computer. The computer receives 3-D locational input data, locating a probe with respect to the front of a display screen and maintains time based probe manipulation and location history. The computer interprets and integrates these 3D inputs in the context of a particular computer program. So, while the same 3-D capacitive image may be received for different computer programs, the computer's displayed response depends upon the particular program, the computer interpreting the input differently for a word processing program differently than for a mechanical design drawing program or for an action video game. The operator interactively responds to changes on the display by moving the probe. In addition, although many current computer programs are enabled to adapt and reduce error using, for example, fuzzy logic or iteration techniques. The TC camera may receive multiple 3-D inputs with the computer adjusting interactively, simultaneously reducing errors from both data processing ends.

Thus, for word processing for example, an operator directly interfaces with a computer screen performing the functions of a virtual mouse or, alternately, a touch pad. A series of probe motions are recognized and executed by the computer. For example, a simple small check movement may establish cursor position, while a different small movement, e.g., a rubbing motion highlights a section for deletion. Similarly, entire sections of words, etc., can be high-lighted, either for deletion or for cut and paste. Documents may be signed interactively online. Also, technical sketches may be entered by hand with dimensions placed on the drawings, with a computer converting the sketches to exact scale or to a solid model (e.g., in isometric) interactively rotating or moving the model, either by command or by virtual control. Similarly, math equations can be entered by hand with a computer converting the rough equations to any typed format of choice, thus facilitating and speeding writing technical papers and reports.

Figure 11A:
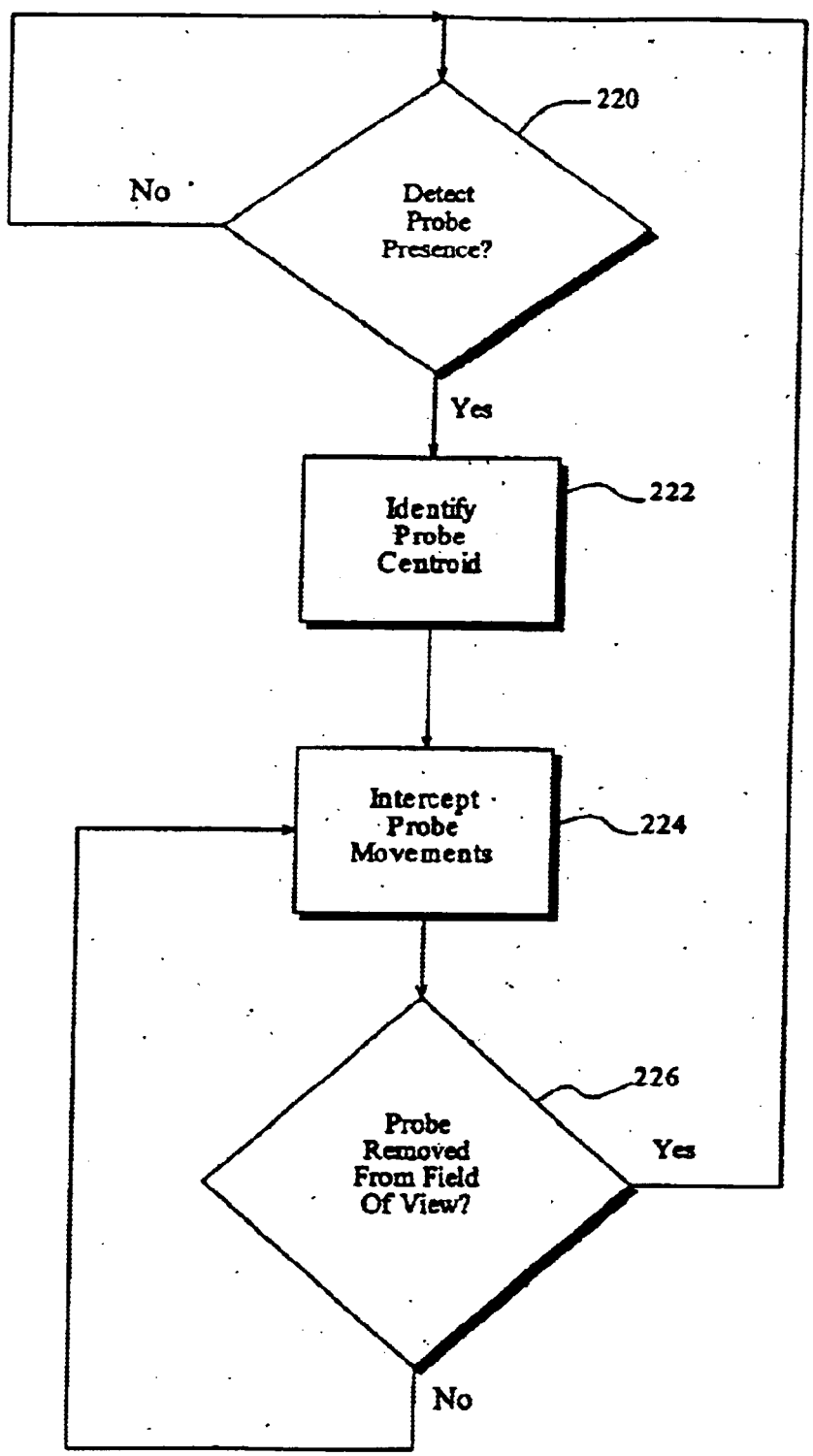
FIGS. 11A–B are flow diagrams showing the steps to effect a basic cursor movement while in a word processing program.
Figure 11B:
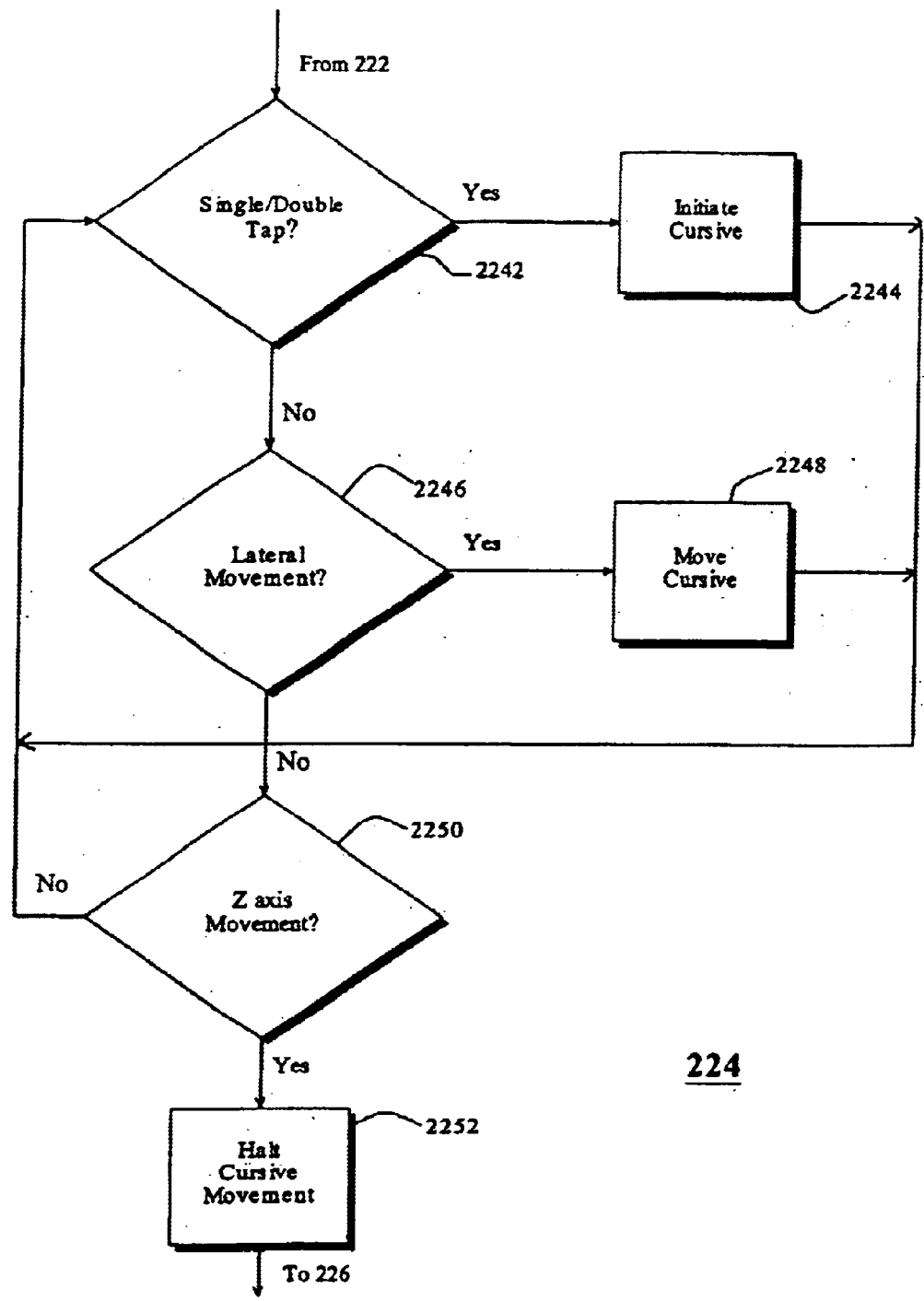

So, FIGS. 11A–B are flow diagrams showing the steps to effect a basic cursor movement while in a word processing program using the 3-D interactive display of the present invention. First in step 220, the TC camera detects the presence of a probe/finger. Then, in step 222 a processor, e.g. an embedded processor, separates the probe/finger image from the operator's hand, which is in the background and, computes the centroid of the probe/finger as defined by its X-Y-Z location. This information is passed to a display controller, e.g. a micro-processor, which interprets the information in step 224. Using a tapping motion, the operator can tap the probe or finger in step 2242 (analogous to a single click on a mouse) without necessarily touching the TC camera surface. In step 2244 the display controller responds to the tapping to compute a corresponding X-Y location for a cursive (including an offset to avoid requiring probe placement that might obstruct the operator's view) and display brightness and/or blinking in a field based on the centroid location. The display controller then displays the cursive on the screen, offset such that the cursive appears above the probe and is visible to the operator at all times. Initially, the cursive may blink, energetically, for a short period of time to draw attention to it and to announce its presence and its location to the operator. After the initial tap, in step 2246 lateral movement causes the cursive to follow the probe in real time in step 2248, highlighting words, pictures and equations it traverses. When the probe is removed, Z axis movement is detected in step 2250 and the cursive is halted in step 2252. Thus, in step 226, when it is determined that the probe has been removed from the transparent capaciflector camera field (i.e., its range changes abruptly), the cursive remains in place and blinks returning to step 220. When the probe is repositioned above or near the cursive, the cursive is reacquired in step 220 (as indicated, for example, by temporarily blinking energetically again) and the computer resumes following probe movement.

The operator may acquire a menu function in the same manner as the cursive is acquired, pointing slightly below the menu function to be acquired and tapping once. It should be noted that tapping is optional, and does not require touching the TC camera surface. The display may respond by changing the icon for the menu function to acknowledge that the icon has been acquired. The operator then may tap the probe twice, again analogous to a mouse double-click, to open the menu.

Other typical word processing functions, such as highlighting, cutting, copying and pasting may be effected using a cursive to follow the probe, much in the same manner as a mouse is used for such operations. Once a section is highlighted, a normal keyboard entry may be used to cut, paste, delete or copy just as is currently done. Further, using the 3-D interactive display, several separate sections of a document may be highlighted simultaneously and selectively operated on simultaneously or independently with the keyboard. Thus, for the above described word processing program, the received 3-D image is a probe or finger centroid and the possible on screen reactions to 3-D image movements may range from establishing a cursive to highlighting a group of words, to opening an icon function, etc.

Virtual writing and drawing pads may be effected using a TC camera of the present invention and inherently, are more effective than current prior art such temperature or pressure sensor array devices. With these prior art devices, a certain pressure must be maintained to sense properly. Elastic movement in a pressure pixel is very small, and the slightest variance in pressure may cause skips or other misinterpretations. By contrast, the transparent capaciflector camera of the present invention measures probe proximity, not pressure or temperature. Thus, movement is modeled and represented as an effective "virtual elastic movement" that may be set electronically, e.g. as an operator adjustment. For a word processing program, writing breaks occur when the writer deliberately lifts the probe away from the display, say on the order of at least 0.01 in., instead of when pressure varies a bit too much. Also, the high resolution of the TC camera is continuously providing determinable readings between pixels that, when combined with the 3-D data, provides detailed information about a particular task (e.g., writing/drawing) as well as affording superior fidelity for hand drawings and hand writing.

For a mechanical design program using the 3-D interactive display of the present invention to model a 3-D mechanical object using, for example Pro-E, the displayed 3-D image may well include portions of the operator's thumb and those fingers nearest the screen. If the rendering of the operator's hand is shown approaching a 3-D display of a mechanical object, on screen reactions to hand movements may include allowing the operator to virtually manipulate the 3-D mechanical object using a "virtual touch/feel/grasp/rotation/translation." Thus, the display reflects appropriate object movement in response to operator hand movements, centering-up in a "virtual grasp" of the 3-D image. As the operator's hand rotates about any combination of the three spacial axes, the virtual grasp rotates, the 3-D hand image and manipulated object with the results being displayed on the screen. When the operator's hand opens, the 3-D hand image releases its virtual touch/grasp. The 3-D mechanical object is displayed remaining suspended in place and in position until virtual movement by a subsequent operator causes it to move. The operator may reposition his/her hand and "virtually regrasp" the object, turning it again in a ratchetting process until a desired view is obtained.

Thus, continuous, high resolution, 3-D imaging data from operator probe movements in the immediate vicinity of a computerized-screen are sensed by an invisible energy field directly over the face of the display screen. In effect the transparent 3-D camera and interactive display provides a 3-D image of an operator probe within 6 in. (150 mm) and closer to a computerized screen and, further, allows precise determination of operator probe point position and movement. The 3D interactive display inherently makes the interaction between probe position and the corresponding displayed computer response very precise, natural and user-friendly. By contrast, existing prior art manual input systems provide intermittent 2-D Data, e.g. from an invisible touch panel with an inelegantly large probe selecting much smaller pixels. In addition, existing 3D data entry devices (such as joysticks) are not transparent and so, cannot be placed directly over a display screen for a more integrated operating environment.

Advantageously, the present invention affords a 3-D, continuous, high-resolution imaging information input device wherein data/information is provided directly and interactively with a display face, thereby affording interaction between an operator and the display in a very direct, precise, natural and user-friendly way. The operator may experience a "virtual touch/feel" that provides a direct and more natural 3-D virtual interface for object manipulation. Accordingly, this virtual touch may be provided on the fly and used to control other input devices, e.g., keyboards, joysticks, touch pads, writing/drawing pads, etc. Such a 3-D interactive display system is easily updated and upgraded, simply by changing the software and may be made independent of computer hardware and processors.

Virtually grasping and manipulating objects gives an operator a sense of the object, which is enhanced when the image responds to the operator's movements, giving the operator the illusion of grasping and manipulating the object itself, e.g. to view previously-hidden features. This virtual touch/feel feature of 3-D interactive display gives operators a positive, immediate and local (ultra user-friendly) sense of how operator actions are interpreted. So, for example, with an operator touching an image of a key on the 3-D interactive display, that key may blink responsively signaling the operator which key is selected. The screen can be curved to interact as a 3-D Shape such as the inside of a ball providing a 3-D Virtual Joystick.

Further, the 3D transparent capaciflective camera of the present invention may be disposed upon a liquid crystal diode (LCD) display for inclusion on a personal digital assistant (PDA) or a laptop computer. Optionally, for a laptop computer the keyboard/mouse/touch pad may be 3-D interactive displays or transparent capaciflector cameras. For such an arrangement, the near screen, i.e., the keyboard, may function as a 3-D interactive control panel in combination with a far screen which is the traditional display. Frequently, it may be advantageous to interface directly with a display image on the far screen, say to rotate or to move an object or to perform cut and paste for word processing. The keyboard can be reconfigured on the fly when a new application is started, e.g., to a phone key pad to make a cell phone call, to TV remote control or, to a remote control for a microwave or a garage door.

Figure 12A:
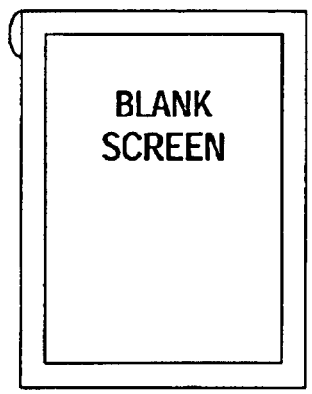
FIGS. 12A–F shows 3-D Interactive Display software-reconfigured into several different input devices.
Figure 12B:
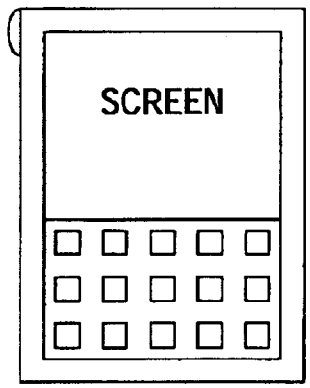
Figure 12C:
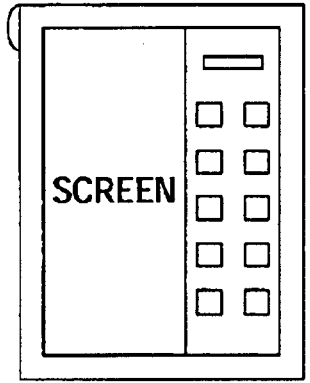
Figure 12D:
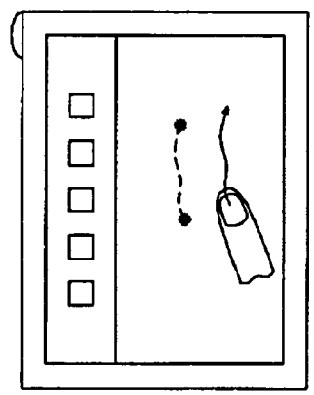
Figure 12E:
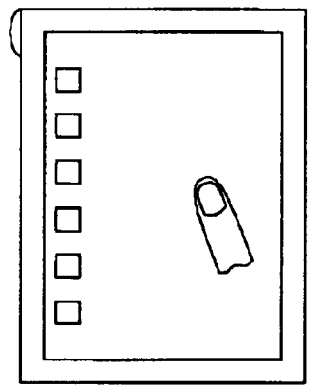
Figure 12F:
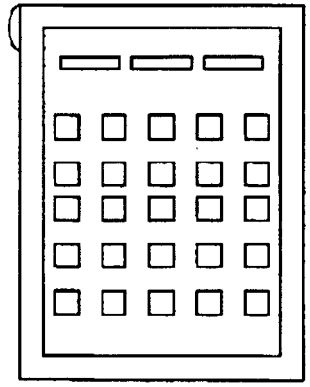

As can be seen from FIGS. 12A–F, the 3-D Interactive Display can be software-reconfigured into any number of input devices, especially keyboards, joy sticks, touch pads, writing/drawing pads, etc. FIG. 12A shows the display 230 turned off or in its deactivated state. The size, spacing, arrangement of function and labels of the soft keys are entirely at the operator's discretion. Thus, FIGS. 12B–C show the screen configured in two different interactive keyboard configurations 232, 234. FIG. 12D is an example of the TC camera 236 configured for use as a virtual mouse. FIG. 12E shows a TC camera 238 adapted for digital ink, for inputting handwritten information. FIG. 12F shows a TC camera adaptation 240 as a keypad for a TV remote control, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A three-dimensional (3-D) interactive display comprising:
   a display screen;
      an array of capaciflective pixels disposed upon said display screen;
      a first group of sensor pads connected to ones of said array of capaciflective pixels;
      a second group of sensor pads connected to ones of said array of capaciflective pixels, capaciflective pixels connected to said first group of sensor pads not being connected to said second group of sensor pads thereby forming a transparent capaciflector camera; and
      an operational amplifier connected to each of said sensor pads, each said amplifier biasing and receiving a signal from a connected sensor pad responsive to intrusion of a probe disposed in front of said display screen, said signal being proportional to probe positional location with respect to said display screen so as to facilitate a direct 3-D input to said display screen.

2. The 3-D interactive display of claim 1, further comprising:
   a transparent shield layer disposed between said display screen and said array of capaciflective pixels.

3. The 3-D interactive display of claim 2, wherein capaciflective pixels connected to each sensor pad of said first group and said second group comprises:
   a plurality of parallel wires;
   a turnaround at one end of said plurality of parallel wires; and
   a sensor pad at an opposite end of said plurality of parallel wires.

4. The 3-D interactive display of claim 3, wherein said plurality of parallel wires comprises five wires spaced a half a centimeter apart, each of said wires spanning said display screen.

5. The 3-D interactive display of claim 3, wherein each of said parallel wires are silver.

6. The 3-D interactive display of claim 2 wherein said transparent shield layer is a layer of conductive glass, said shield layer and said capaciflective pixels being biased and driven identically.

7. The 3-D interactive display of claim 2 wherein said transparent shield layer is a layer of conductive glass.

8. The 3-D interactive display of claim 6, said shield layer including a shield pad, said shield pad connected to another operational amplifier, said 3-D interactive display further comprising:
    an oscillator driving operational amplifiers connected to each sensor pad and said shield pad, said shield being biased and driven identically to said capaciflective pixels.

9. The 3-D interactive display of claim 8, said oscillator frequency being 100 KHz, said oscillator output voltage being 12 volts or less.

10. The 3-D interactive display of claim 9, said 3-D interactive display being connected to and interfacing with a computer.

11. The 3-D interactive display of claim, 1, wherein capaciflective pixels connected to said first group of sensor pads are arranged in columns and capaciflective pixels connected to said second group of sensor pads are arranged in rows.

12. The 3-D interactive display of claim 1, further comprising a protective coating over said array.

13. The 3-D interactive display of claim, 1, wherein each of said capaciflective pixels is a transparent conductive plate.

14. The 3-D interactive display of claim 13 wherein capaciflective pixels connected to each of said sensor pads in each of said first and second groups are arranged in alternating pixels and spaces such that when capaciflective pixels connected to sensor pads from said first group are overlaid by capaciflective pixels from said second group, said display screen is covered with a single layer of alternating pixels from either group.

15. The 3-D interactive display of claim 14 wherein each of said capaciflective pixels is a layer of conductive glass.

16. A method of making a 3-D interactive display, said method comprising the steps of:
    a) forming a shield layer on a non-conductive substrate, said shield layer being a transparent layer of conductive material;
    b) forming a first dielectric layer on said shield layer;
    c) forming a first wire layer on said first dielectric layer;
    d) forming a second dielectric layer over said first wire layer;
    e) forming a second wire layer over said second dielectric layer; and
    f) forming a protective coating layer on said second wire layer so as to facilitate a direct 3-D input to said protective coating layer.

17. The method of claim 16 wherein the second wire layer is formed orthogonally to said first wire layer.

18. The method of claim 17 wherein said steps c) and d) further comprises:
    i) forming a plurality of groups of parallel wires spanning said substrate;
    ii) forming a turnaround at one end of said of each of said groups; and
    iii) forming a pad at an opposite end of each said groups.

19. The method of claim 18 wherein in step (i) each wire is formed by depositing silver paste and curing said deposited silver paste.

20. The method of claim 16 wherein said shield layer is formed by depositing a layer of conductive glass on a glass substrate.

21. The method of claim 20 further comprising forming a shield pad on said conductive glass layer.

22. The method of claim 21 further comprising forming vias to pads in each of said shield layer and said wire layers.

23. The method of claim 21 further comprising:
    forming a first pixel layer, said first pixel layer being formed on said first wire layer, said second dielectric layer being formed on said first pixel layer; and
    forming a second pixel layer on said second dielectric layer, said second wire layer being formed on said second pixel layer.

24. The method of claim 21 wherein said first pixel layer and said second pixel layer are each comprised of a plurality of pixel plates.

25. A 3-D interactive display comprising:
    a display screen;
    a transparent shield layer on said display screen;
    a first dielectric layer on said shield layer;
    a first wire layer on said first dielectric layer, wires on said first wire layer disposed in a first direction;
    a second dielectric layer on said first wire layer;
    a second wire layer on said second dielectric layer, wires on said second wire layer disposed orthogonally to wires on said first wire layer; and
    a surface dielectric layer on said second wire layer so as to facilitate direct 3-D input to said display screen.

26. The device of claim 25, wherein said first wire layer and said second wire layer each comprises:
    a plurality of groups of parallel wires;
    a turnaround at one end of each said group of parallel wires; and
    a sensor pad at an opposite end of each said group of parallel wires.

27. The device of claim 26 wherein each said group of parallel wires comprises five silver wires spaced a half a centimeter apart.

28. The device of claim 25 wherein said transparent shield layer is a layer of conductive glass and includes a shield pad disposed at one side.

29. The device of claim 28, further comprising:
    a via at each said sensor pad; and
    a via at said shield pad, each said via filled with silver epoxy and extending upward from said sensor pad or said shield pad to an upper surface of said surface dielectric layer.

30. A 3-D interactive display comprising:
    a display screen;
    a transparent shield layer on said display screen;
    a first dielectric layer on said transparent shield layer;
    a first wire layer on said first dielectric layer;

a first pixel layer, wires on said first wire layer contacting pixels on said first pixel layer;

a second dielectric layer on said first pixel layer;

a second pixel layer on said second dielectric layer;

a second wire layer on said second pixel layer, wires on said second wire layer contacting pixels on said second pixel layer; and a surface dielectric layer on said second wire layer so as to facilitate direct 3-D input to said display screen.

31. The device of claim 30, wherein each wire on said first wire layer and said second wire layer contacts a sensor pad.

32. The device of claim 31 wherein said transparent shield layer and each pixel is a layer of conductive glass, said transparent shield layer including a shield pad disposed at one side.

33. The device of claim 30, further comprising:

a via at each said sensor pad; and a via at said shield pad, each said via filled with silver epoxy and extending upward from said sensor pad or said shield pad to an upper surface of said surface dielectric layer.

* * * * *